May 19, 1931.　　　K. F. NYSTROM　　　1,806,411
PEDESTAL FILLER UNIT
Filed Nov. 12, 1928　　2 Sheets-Sheet 1
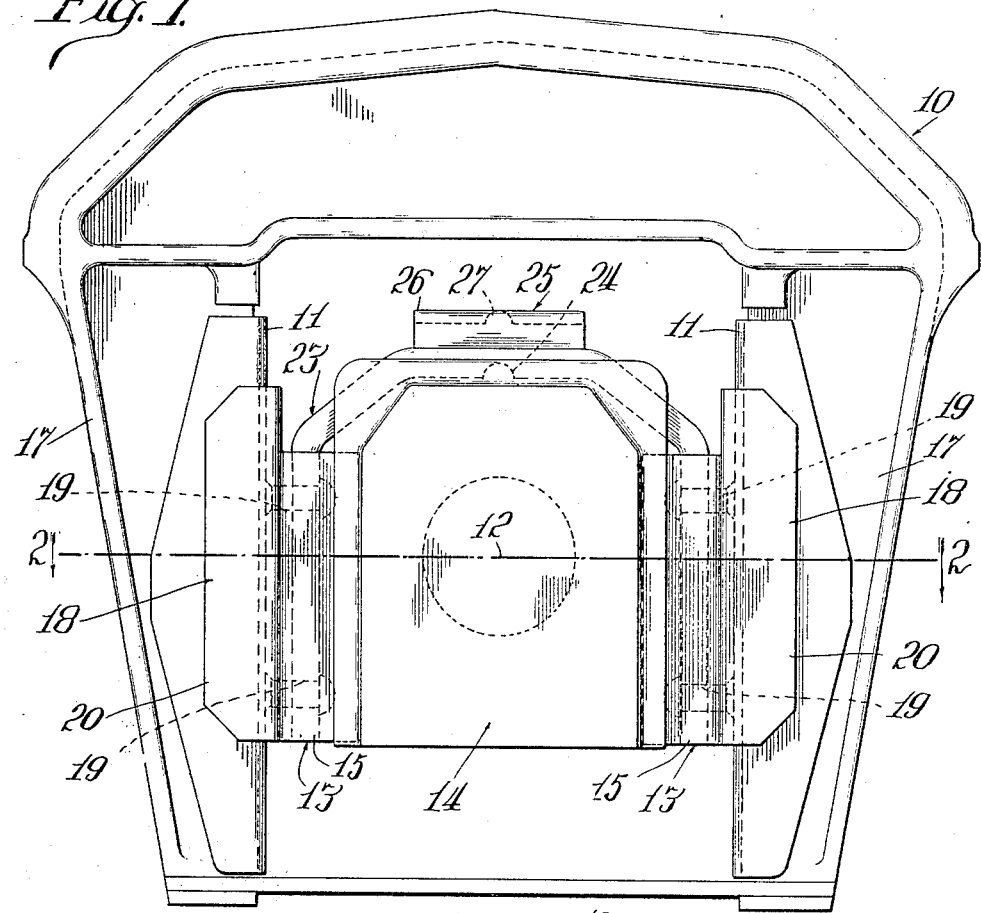

May 19, 1931. K. F. NYSTROM 1,806,411
PEDESTAL FILLER UNIT
Filed Nov. 12, 1928 2 Sheets-Sheet 2
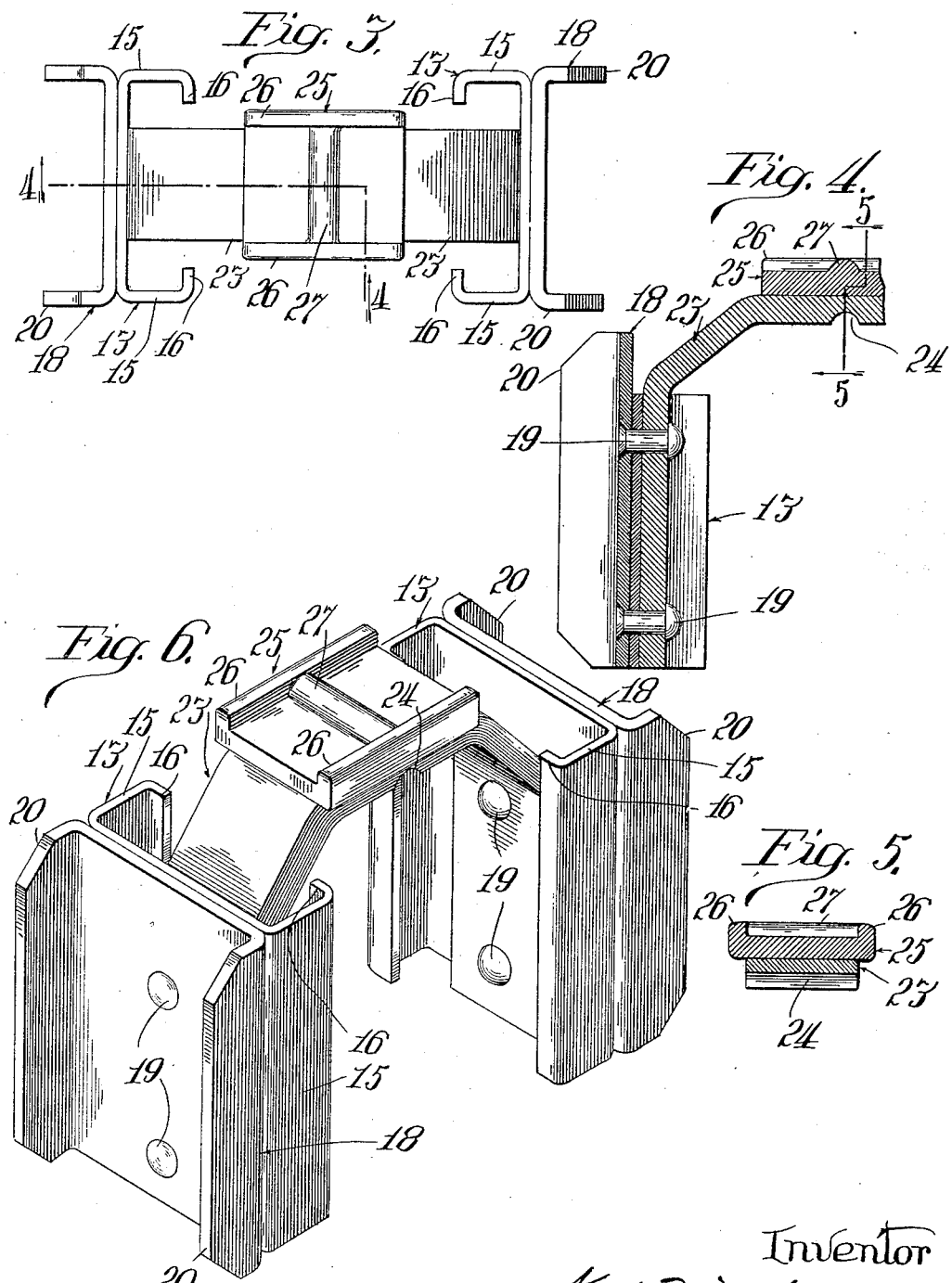

Patented May 19, 1931

1,806,411

UNITED STATES PATENT OFFICE

KARL F. NYSTROM, OF MILWAUKEE, WISCONSIN, ASSIGNOR TO GENERAL STEEL CASTINGS CORPORATION, OF GRANITE CITY, ILLINOIS, A CORPORATION OF DELAWARE

PEDESTAL FILLER UNIT

Application filed November 12, 1928. Serial No. 318,709.

My invention relates to means adapted for use with trucks of railroad cars; the invention having for its object the provision of means whereby substitution of the well known type of friction bearing journal-box may, when necessity requires, be readily substituted for the roller bearing type of journal-box at present employed in the pedestals of the car trucks; such substitution of my improved means being readily accomplished at any suitable point on the line of the railroad, without the necessity and expense on the part of the railroad to maintain and carry in stock a number of rather expensive spare roller bearing units.

The objects and advantages of my invention, will be readily comprehended from the detailed description of the accompanying drawings, wherein—

Figure 1 illustrates, in elevation, the pedestal of a truck adapted for roller bearing journal-boxes, with the wheel of the truck omitted.

Figure 2 is a cross sectional view taken substantially on the line 2—2 of Figure 1 looking in the direction of the arrows.

Figure 3 is a plan view of my improved pedestal filler means.

Figure 4 is a detail sectional view taken on the line 4—4 of Figure 3 as indicated by the arrows.

Figure 5 is a detail sectional view taken on the line 5—5 of Figure 4, looking in the direction of the arrows.

Figure 6 is a perspective view of my improved pedestal filler means.

In the particular exemplification as disclosed in the drawings, the end or pedestal portion of a truck frame is shown in Figure 1, namely a pedestal 10 of the type at present employed for roller bearing journal-boxes which, in their application as now employed, require the use of a special axle while the application of the boxes requires the bearings to be applied under pressure, namely an operation which cannot readily be performed at the smaller shops or points along the right of way.

The pedestals employed in connection with the roller bearings are made to receive a journal-box having a greater spread between the pedestal faces 11, 11 than is the case with the usual friction bearing type more generally in use.

That is to say, certain types of roller bearings, as now used in railroad rolling stock, employ an outer box having a spread of fifteen inches between the pedestal faces 11; whereas the commonly used friction bearing type has a box with a spread of only nine inches; while at the same time the distance between the center line 12 of the axle to the bearing face of the equalizer above on the roller bearing type of box is approximately one and seven-eighths of an inch greater than is the distance for the ordinary friction bearing type.

It is to meet these conditions and to enable the substitution of the ordinary friction bearing type of axle and journal-box in a pedestal made for a roller bearing journal-box that I have devised my improved pedestal filler means, which, in its specific embodiment, comprises a metal pressing or plate 13, preferably formed C-shape in cross-section, of vertical dimensions substantially equal to the vertical sides of journal-box generally indicated at 14. The vertically disposed side flange portions 15, 15 of the filler member or plate 13 are disposed toward the journal-box 14, with the immediate ends or longitudinal sides thereof bent inwardly toward each other as shown at 16, 16, and adapted to extend within the vertically grooved sides of the journal-box as shown in Figure 2; the base portion of the channeled member 13 being disposed toward the pedestals 17.

In conjunction with each of the members 13, I provide a metallic pressing or channel plate 18, on each side of the journal-box.

The channeled plates 18 are arranged with the flanges or sides disposed outwardly and each member 18 is preferably riveted, as at 19, to its respective member 13; the base portions of members 13 and 18 being arranged flush with each other as shown in Figures 2, 3 and 6. The member 18 is of width sufficient to permit the sides 20, 20 to lap the sides of the adjacent pedestal 17 in the manner shown in Figure 2.

It is apparent from the construction shown and described that the play or spacing between the ordinary friction bearing or journal-box indicated at 14 and the pedestal is thus taken care of and the proper relation of the elements thus maintained.

The filler elements on each side of the journal-box, namely elements 13 and 18, are operatively held together by means of a yoke member 23 which is in the nature of a metallic strap or bar bent into somewhat inverted U-shape as shown in Figures 1 and 6. This yoke is intended to extend across the top of the journal-box 14; the strap or yoke member 23, at its intermediate point and on the inner surface thereof, being shown provided with a transverse groove 24 to fit the usual rib on top of the journal-box. The ends or sides of the yoke member 23 extend within the channel of the members 13 and are secured to the base portions thereof by the rivets 19, thus firmly connecting the filler elements on opposite sides of the journal-box.

The strap or yoke member 23 on its upper face is provided with a filler block 25 which is adapted to compensate for the difference in height of the two kinds of journal-boxes on a truck originally made for use with the roller bearing type of journal-box.

That is to say, the yoke with the filler block 25 is to take care of the difference in height from the center line of the axle to the bearing face of the equalizer when the ordinary friction bearing is substituted which, as previously stated, is approximately one and seven-eighths of an inch less than the distance between the center line of the axle and the equalizer when roller bearings are employed in the pedestal. The filler block 25 is shown provided with upstanding sides 26, 26 and preferably provided with the transversely disposed rib 27 extending from side to side, as shown in Figures 4 and 6.

The rib 27 of the block fits into a transverse groove in the equalizer bar while the sides 26, 26 of the block straddle the sides of the equalizer bar and thus maintain the relative positions of the journal boxes and the equalizer bar. This filler block is secured to the yoke in any suitable manner, thus providing a unit as disclosed in Figures 3 and 6 which may be readily inserted into place over the friction type of journal-box when the latter is to be used in a pedestal which has been designed to receive a roller bearing type of journal-box.

With my improved pedestal filler unit, a great saving by the railroads is obtained because it eliminates the necessity on the part of the railroad to carry in stock extra wheels equipped with roller bearing boxes. Application of roller bearing boxes requires the use of a special axle and the application of these boxes requires the bearings to be applied under pressure, an operation which cannot readily be accomplished at all points along the right-of-way.

Should any difficulty be encountered with a roller bearing journal, as for example flat wheels caused by frictional sliding on the rails, the roller bearing box and journal may be removed and replaced by a journal with wheels provided with the usual standard A. R. A. friction type of bearing boxes and the application of my improved pedestal filler unit thereto, thus enabling the car to be kept in service.

I have described the specific exemplification of my invention in terms employed merely as terms of description and not as terms of limitation, as structural modifications may be made without, however, departing from the spirit of my invention.

What I claim is:—

1. A pedestal filler unit adapted to maintain proper spaced relation between the pedestal and the journal-box of a car truck, comprising channeled metallic plates arranged in pairs on each side of the journal-box with the flanges of one plate lapping the sides of the pedestal while the flanges of the other plate engages the adjacent side of the journal-box, and means whereby the plates on both sides of the journal-box are secured together.

2. A pedestal filler unit adapted for use in a roller bearing type of car truck in conjunction with the friction type of journal-box, comprising a pair of channeled plates disposed vertically on each side of the journal-box with the flanges of one plate formed to lap the sides of the pedestal while the flanges of the other plate are adapted to engage the sides of the journal-box, a yoke member adapted to extend across the top of the journal-box and having its ends secured to the pair of plates on each side of the journal-box, and a filler block secured to the intermediate portion of said yoke member to compensate for the play between the equalizer of a roller bearing type of a car truck and the friction type of journal-box.

3. A pedestal unit adapted for use in a roller bearing type of car truck in conjunction with the friction type of journal box comprising members disposed vertically on each side of the journal box in sliding relation with the pedestal and in bearing relation with the journal box, a yoke member extending across the top of the journal box with its end secured to said first mentioned members, and a filler block carried by the intermediate portion of the yoke member, said filler block having a transversely upwardly disposed rib and upstanding sides for engagement with the equalizer bar of the truck to maintain proper relation.

4. A pedestal filler unit adapted to maintain proper spaced relation between the pedestal and the journal-box and between the journal-box and the equalizer of a railroad car truck, comprising a pair of channeled plates disposed vertically on each side of the journal-box with the flanges of one plate lapping the sides of the pedestal while the flanges of the other plate are disposed toward the sides of the journal-box, and a yoke member adapted to extend across the journal-box with its ends secured to the plates on each side of the journal-box.

5. A pedestal filler unit adapted to maintain proper spaced relation between the pedestal and the journal-box and between the journal-box and the equalizer of a railroad car truck, comprising members disposed vertically on each side of the journal-box in sliding relation with the pedestal and in bearing relation with the journal-box, a yoke member adapted to extend across the top of the journal-box with its ends secured to said first mentioned members, and a filler block carried by the intermediate portion of the yoke member.

6. A pedestal filler unit adapted to fit over the top of the journal-box of a railroad truck and to extend down opposite sides of the journal-box, said unit comprising a narrow yoke portion and relatively wide metallic plates secured to the ends of the yoke portion, said plates being formed to engage the sides of the pedestal of a car truck and the sides of the journal-box.

7. A pedestal filler unit adapted to maintain proper spaced relation between the pedestal and the journal-box and between the journal-box and the equalizer of a railroad car truck, comprising spaced members disposed vertically on each side of the journal-box in sliding relation with the pedestal and in bearing relation with the journal-box, and a relatively narrow metallic strap disposed across the top of the journal-box, with said members secured to the ends thereof.

8. A member adapted to be placed over a railway journal-box and comprising an inverted U shaped strap and elements wider than said strap secured to the legs of said strap and arranged to engage the side walls and flanges of a journal-box and to engage the legs of a truck pedestal spaced from the sides of the journal-box.

9. A member adapted to be placed over a railway journal-box and comprising an inverted U shaped strap and elements wider than said strap secured to the legs of said strap and arranged to engage the side walls and flanges of a journal-box and to engage the legs of a truck pedestal spaced from the sides of the journal-box, and an element wider than said strap secured to the top bar of said strap and arranged to support an equalizer bar at a point spaced above said box.

10. A journal-box and pedestal filler device comprising a yoke consisting of a strap bent into an inverted U shape and a pair of channels arranged back to back and secured to each leg of said yoke, one of said channels being arranged to receive a pedestal jaw and the other of said channels being arranged to engage the side flanges of a journal-box.

11. As a new article of manufacture, a device adapted to fit over a railway axle journal-box and comprising members adapted to interengage with the box and pedestal side walls to space the same from each other, and a relatively narrow yoke element connecting said members.

12. As a new article of manufacture, a device adapted to fit over a railway axle journal-box and comprising members adapted to interengage with the box and pedestal side walls to space the same from each other, an equalizer bar seat member and a relatively narrow yoke element connecting said members.

13. In combination, a railway truck pedestal having spaced jaws, a journal box with flanges on its sides, the width of said box across its flanges being less than the distance between said pedestal jaws, and a box and pedestal spacing member comprising a strap-like yoke fitting over said box with channel shaped plates secured to each of its depending legs, one of said plates receiving the sides of the adjacent pedestal jaw between its flanges and the other of said plates having its flanges secured between the flanges of said box.

KARL F. NYSTROM.